US009001796B2

(12) United States Patent
Frederiks et al.

(10) Patent No.: US 9,001,796 B2
(45) Date of Patent: Apr. 7, 2015

(54) TEMPORARY MEDIUM HANDOVER (71) Applicant: QUALCOMM Incorporated, San Diego, CA (US)

(72) Inventors: Guido Robert Frederiks, Aptos, CA (US); James C. Cho, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 13/717,583

(22) Filed: Dec. 17, 2012

(65) Prior Publication Data

US 2014/0126550 A1 May 8, 2014

Related U.S. Application Data (60) Provisional application No. 61/722,638, filed on Nov. 5, 2012.

(51) Int. Cl.
*H04W 72/10* (2009.01)
*H04W 74/08* (2009.01)

(52) U.S. Cl.
CPC ............ *H04W 72/10* (2013.01); *H04W 74/085* (2013.01)

(58) Field of Classification Search
CPC ....................................................... H04W 72/10
USPC ........................................................ 370/336
See application file for complete search history.

(56) References Cited

U.S. PATENT DOCUMENTS

| | | | |
|---|---|---|---|
| 7,599,340 B2 | 10/2009 | Chandra et al. | |
| 7,852,823 B2 | 12/2010 | Nakashima et al. | |
| 2010/0061342 A1 | 3/2010 | Frederiks et al. | |
| 2012/0087355 A1 | 4/2012 | Wentink | |

FOREIGN PATENT DOCUMENTS

| | | | |
|---|---|---|---|
| EP | 1429494 | * | 6/2004 |
| EP | 1429494 A1 | | 6/2004 |
| EP | 2051559 A2 | | 4/2009 |
| EP | 2051559 | * | 4/2014 |
| JP | 7312602 A | | 11/1995 |

OTHER PUBLICATIONS

International Search Report and Written Opinion—PCT/US2012/070363—ISA/EPO—Jul. 19, 2013.
IEEE 802.11 "Part 11: Wireless LAN Medium Access Control (MAC) and Physical Layer (PHY) Specifications", Mar. 2012, pp. 1-2793.

* cited by examiner

*Primary Examiner* — Dang Ton
*Assistant Examiner* — Mewale Ambaye
(74) *Attorney, Agent, or Firm* — Mahamedi Paradice LLP (57) ABSTRACT A system and method are disclosed that reduce collisions on a wireless medium shared by devices associated with a wireless network, thereby improving throughput on the wireless medium. For some embodiments, a first device reserves access to the medium for a first interval, and then grants medium access to a second device for a remainder of the first interval. If the second device transmits data during the remainder of the first interval, medium access is maintained with the second device and then the second device is prevented from contending for medium access during a subsequent contention period. Otherwise, medium access is returned to the first device and the second device is allowed to contend for medium access during the contention period.

29 Claims, 9 Drawing Sheets

TEMPORARY MEDIUM HANDOVER

CROSS-REFERENCE TO RELATED APPLICATIONS

This application claims the benefit under 35 USC 119(e) of the co-pending and commonly owned U.S. Provisional Application No. 61/722,638 entitled "TEMPORARY MEDIUM HANDOVER" filed on Nov. 5, 2012, the entirety of which is incorporated by reference herein.

TECHNICAL FIELD

The present embodiments relate generally to wireless networks, and specifically to controlling access to a shared communication medium associated with wireless networks.

BACKGROUND OF RELATED ART

In many wireless network systems such as Wi-Fi and Bluetooth networks, multiple devices compete for control of a shared communication medium (e.g., Wi-Fi channels). For example, a Wi-Fi network typically includes an access point (AP) in wireless communication with a number of stations (STAs). Because the wireless communication medium is shared by all devices associated with the Wi-Fi network, collisions may occur when multiple devices attempt to transmit data on the medium at the same time. When collisions occur, none of the devices may be able to receive data transmitted by other devices, and the collided data may need to be re-transmitted on the medium. Thus, data collisions on a shared wireless communication medium reduce the overall throughput of the medium, which in turn degrades performance of the wireless network. As the number of devices associated with a wireless network increases, the chances for collisions also increase.

To reduce the occurrence of collisions, the IEEE 802.11 standards define a distributed coordination function (DCF) that instructs individual STAs (and APs) to "listen" to the communication medium to determine when the medium is idle (e.g., using a "carrier sense" technique). Only when a STA detects that the medium has been continuously idle for a DCF Interframe Space (DIFS) duration may it attempt to transmit data on the medium. As a result, for wireless networks having a plurality of associated STAs, a multitude of devices may be listening to the medium at the same time to detect idle periods and thereafter gain access to the medium.

To prevent multiple devices from accessing the medium at the same time, each STA (and/or each AP) may be assigned a random "back-off" period or number. At the end of the DIFS duration, each STA waits for a period of time determined by its back-off number (e.g., its back-off period) before it transmits data on the medium. However, because the quantity of unique back-off numbers is limited, multiple STAs may be assigned the same back-off number, which in turn may result in multiple STAs transmitting data on the medium at the same time. As a result, the assignment of random back-off numbers to STAs (and/or APs) associated with a wireless network may not be sufficient to avoid collisions on the shared medium.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A wireless system and method are disclosed that reduce collisions on the wireless medium shared by devices associated with the wireless network, thereby improving throughput on the wireless medium. In accordance with the present embodiments, a first device and a second device associated with the wireless medium may negotiate a number of temporary medium handover (TMH) parameters (e.g., during association operations between the devices). The first device may reserve access to the wireless medium for a first transmission interval, and thereafter transmits a first data frame to the second device. The first data frame may grant temporary medium access to the second device for a remainder of the first transmission interval (e.g., for a TMH period).

The first device may inform the second device that it has been granted medium access in any suitable manner, for example, as agreed upon during negotiation of the TMH parameters. For some operations, the first device may explicitly inform the second device of the medium access grant by embedding a trigger signal within the first data frame sent to the second device. For other embodiments, the first device may implicitly inform the second device of the medium access grant merely by sending the data frame to the second device.

The second device receives the first data frame, and may acknowledge its receipt by sending an acknowledgement (ACK) frame to the first device. If the second device has data to send, then the second device transmits a second data frame. Because the second transmitted data during the TMH period, the second device is prevented from contending for medium access during a next contention period. This ensures that other devices (e.g., that did not transmit data during the TMH period) may have access to the medium before the second device once again has medium access, thereby providing fair medium access to all devices associated with the shared wireless medium. Conversely, if the second device does not have data to send, then the second device is enabled to contend for medium access during the next contention period. This ensures that the second device will have the same opportunity for medium access during the next contention period as other devices associated with the shared wireless medium.

The first device monitors the medium to determine whether the second device transmitted a data frame during the TMH period. If the first device determines that the second device transmitted a data frame during the TMH period, then the second device's medium access is maintained. Maintaining the second device's medium access may allow the second device to continue transmitting data frames for the duration of the TMH period. Conversely, if the first device determines that the second device has not transmitted any data frames during the TMH period, then medium access is returned to the first device. Returning medium access to the first device for the remainder of the TMH period may avoid idle periods on the shared wireless medium, thereby increasing throughput of the shared wireless medium.

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

The present embodiments are described below in the context of data exchanges between Wi-Fi enabled devices for simplicity only. It is to be understood that the present embodiments are equally applicable to data exchanges using signals of other various wireless standards or protocols, as well as for data exchanges using signals of one or more wired standards or protocols (e.g., Ethernet and/or HomePlug/PLC standards). As used herein, the terms WLAN and Wi-Fi can include communications governed by the IEEE 802.11 family of standards, Bluetooth, HiperLAN (a set of wireless standards, comparable to the IEEE 802.11 standards, used primarily in Europe), and other technologies having relatively short radio propagation range. In addition, although described above in terms of a wireless communication medium, the present embodiments may be applied to wired communication mediums (e.g., fiber optic cables, twisted pair cable, co-axial cable, and so on). Thus, as used herein, the term "medium access" refers to gaining and/or controlling access to a shared communication medium. Further, as used herein, the term "TMH period" refers to a portion of a transmission interval for which one device grants medium access to another device.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The present embodiments are not to be construed as limited to specific examples described herein but rather to include within their scopes all embodiments defined by the appended claims.

Figure 1:
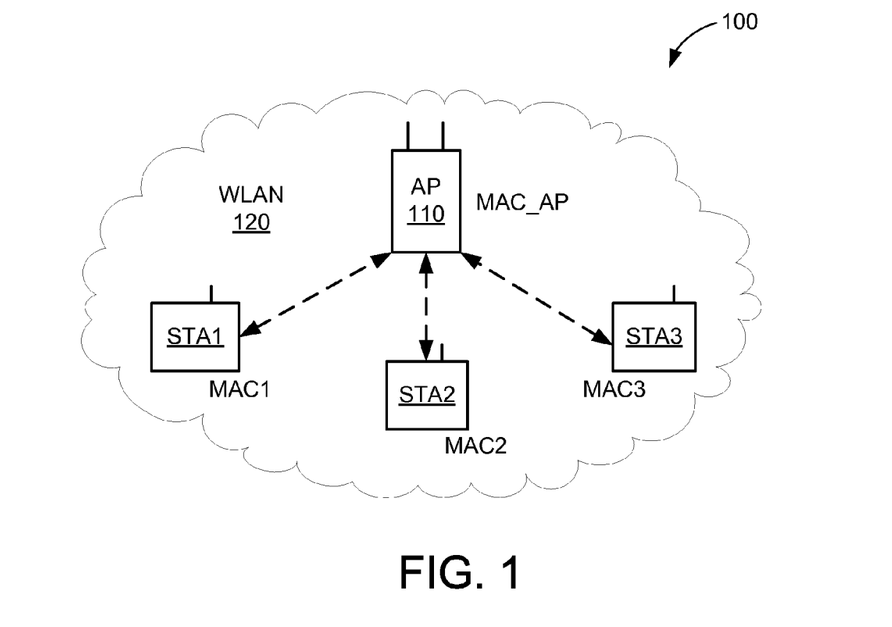
FIG. 1 shows a block diagram of a WLAN system within which the present embodiments may be implemented.

FIG. 1 is a block diagram of a wireless network system 100 within which the present embodiments may be implemented. The system 100 is shown to include three wireless stations STA1-STA3, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 can be formed by any number of access points such as AP 110. The AP 110 is assigned a unique MAC address (MAC_AP) that is programmed therein by, for example, the manufacturer of the access point. Similarly, each of STA1-STA3 is also assigned a unique MAC address (MAC1-MAC3, respectively). Each MAC address, which may be commonly referred to as the "burned-in address," the organizationally unique identifier (OUI), or the Basic Service Set ID (BSSID), in one embodiment includes six bytes of data. The first 3 bytes of the MAC address may identify which organization manufactured the device, and may be assigned to such organizations by the Institute of Electrical and Electronic Engineers (IEEE). The second 3 bytes of the MAC address, which may be referred to as the network interface controller (NIC) specific bytes, may be used to uniquely identify the individual device.

The stations STA1-STA3 may be any suitable Wi-Fi enabled wireless devices including, for example, cell phones, personal digital assistants (PDAs), tablet devices, laptop computers, or the like. For at least some embodiments, stations STA1-STA3 may include a transmitter/receiver circuit, one or more processing resources, one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 5.

The AP 110 may be any suitable device that allows one or more wireless devices to connect to a network (e.g., a LAN, WAN, MAN, and/or the Internet) via AP 110 using Wi-Fi, Bluetooth, or any other suitable wireless communication standards. For at least one embodiment, AP 110 may include a network interface, one or more processing resources, and one or more memory sources. The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 5.

Figure 2:
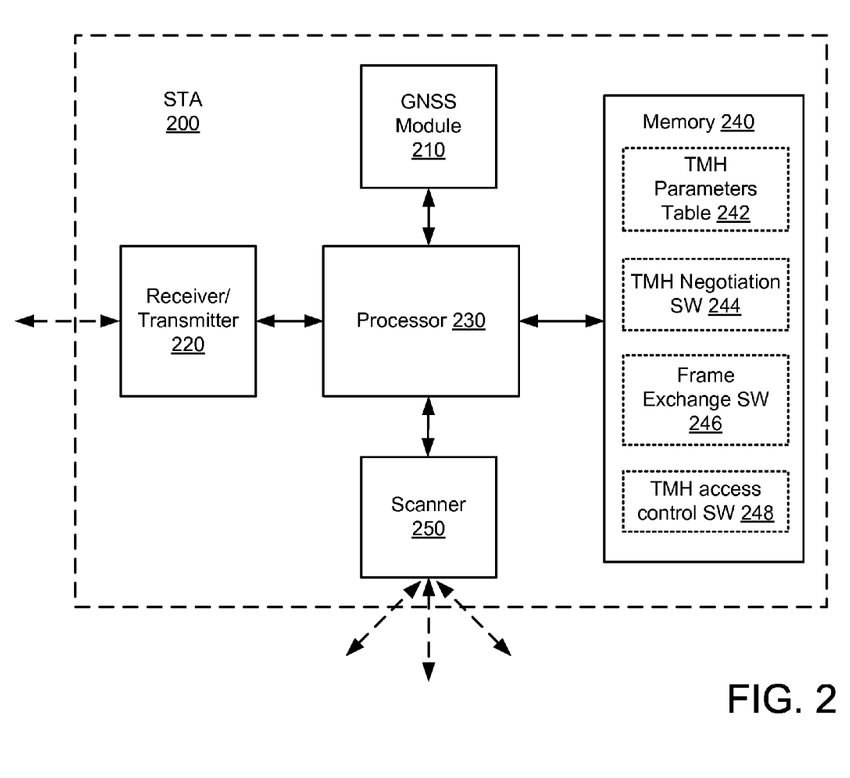
FIG. 2 shows a block diagram of a wireless station (STA) in accordance with some embodiments.

FIG. 2 shows a STA 200 that is one embodiment of at least one of the stations STA1-STA3 of FIG. 1. The STA 200 includes a global navigation satellite system (GNSS) module 210, a transmitter/receiver circuit 220, a processor 230, a memory 240, and a scanner 250. The transmitter/receiver circuit 220 can be used to transmit signals to and receive signals from AP 110 (see also FIG. 1). Scanner 250, which is well-known, can be used to scan the surrounding environment to detect and identify nearby access points (e.g., access points within range of STA 200). For some embodiments, the scanner 250 can search for nearby access points by periodically transmitting MAC address request frames (e.g., probe requests). An AP within range of STA 200 receives one or more of the requests and responds by transmitting its MAC address to the STA 200. If the STA 200 has line-of-sight with a suitable number (e.g., 3 or more) of navigation satellites, the GNSS module 210 can determine the current location of the STA 200 using triangulation techniques, and can then provide the location information to processor 230 for storage in memory 240.

Memory 240 may include a temporary medium handover (TMH) parameters table 242 that stores a number of TMH parameters, transmission schedules, time slots, back-off periods, random back-off numbers, and/or other parameters associated with contending for and/or controlling access to the shared communication medium of the WLAN 120 of FIG. 1. The TMH parameters may include, for example, an indication of one or more TMH triggers, a length of a TMH period, an indication of whether the TMH period may be dynamically adjusted, a duration of a contention hold-off period, and/or an indication of the type of data that may be transmitted during the TMH period.

Figure 5:
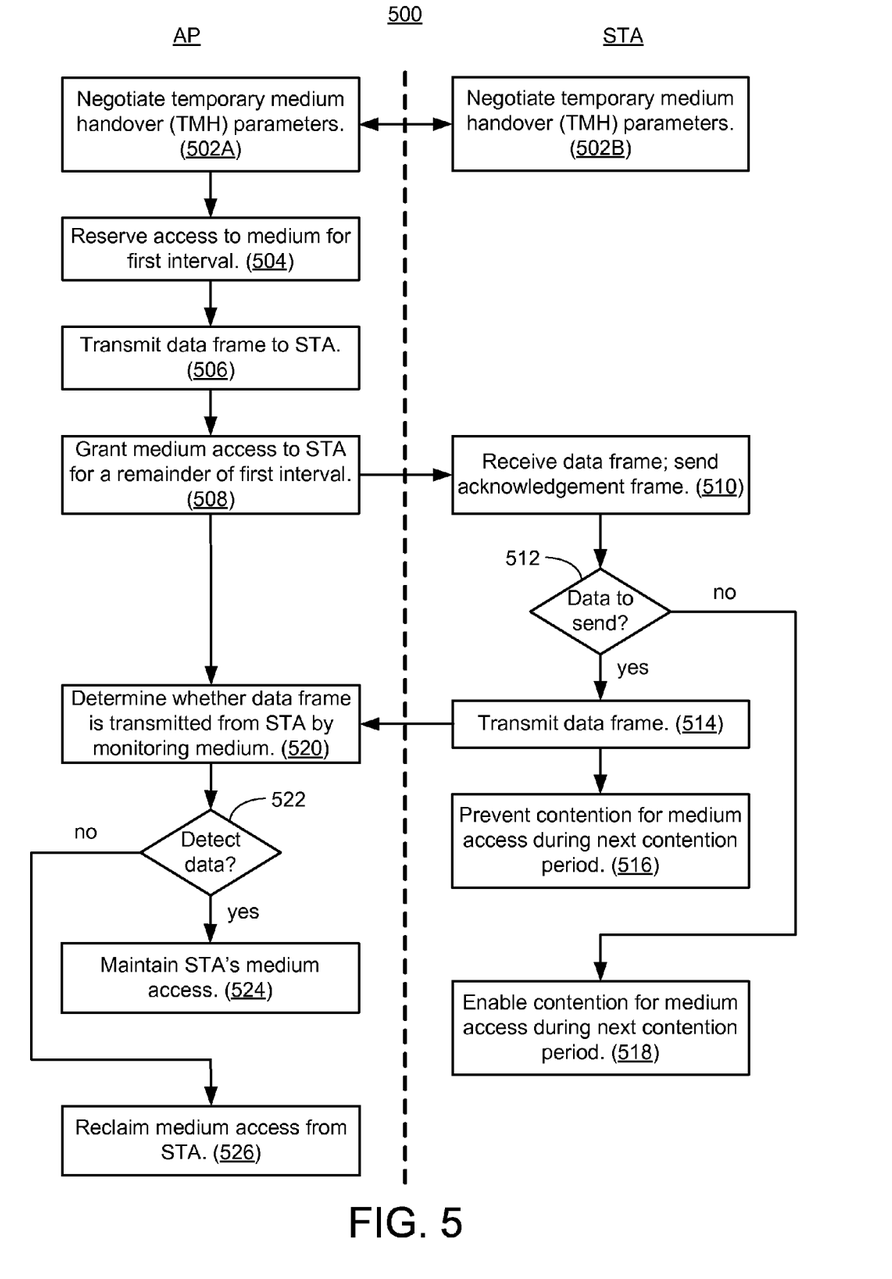
FIG. 5 shows an illustrative flow chart depicting an exemplary data exchange between wireless devices in accordance with some embodiments.

Memory 240 may also include a non-transitory computer-readable medium (e.g., one or more nonvolatile memory elements, such as EPROM, EEPROM, Flash memory, a hard drive, and so on) that can store the following software modules:

- a TMH negotiation software module 244 to facilitate the negotiation of a number of TMH parameters with AP 110 and/or one or more other STAs (e.g., as described for operation 502B of FIG. 5);
- a frame exchange software module 246 to facilitate the creation and/or exchange of various frames (e.g., request frames, association frames, response frames, management frames, control frames, data frames, and/or other suitable types of frames) with AP 110 and/or one or more other STAs (e.g., as described for operations 510 and 514 of FIG. 5); and
- a TMH access control software module 248 to share and/or control access to the shared communication medium (e.g., as described for operations 516 and 518 of FIG. 5).

Each software module includes instructions that, when executed by processor 230, cause STA 200 to perform the corresponding functions. The non-transitory computer-readable medium of memory 240 thus includes instructions for performing all or a portion of the STA-side operations of the method of FIG. 5.

Processor 230, which is coupled to transmitter/receiver circuit 220, GNSS module 210, memory 240, and scanner 250, can be any suitable processor capable of executing scripts or instructions of one or more software programs stored in STA 200 (e.g., within memory 240). For example, processor 230 can execute TMH negotiation software module 244 to facilitate the negotiation of a number of TMH parameters with AP 110 and/or one or more other STAs (as well as other parameters negotiated and/or exchanged during an association operation between STA 200 and a nearby AP). For some embodiments, the TMH parameters may be exchanged using vendor specific information elements within frames exchanged during or after WLAN association operations. Processor 230 can also execute frame exchange software module 246 to facilitate the creation and/or exchange of association request frames, probe REQ frames, response frames, management frames, control frames, and/or data frames with the AP 110 and/or one or more other STAs. Processor 230 can also execute TMH access control software module 248 to share and/or control access to the shared communication medium.

Figure 3:
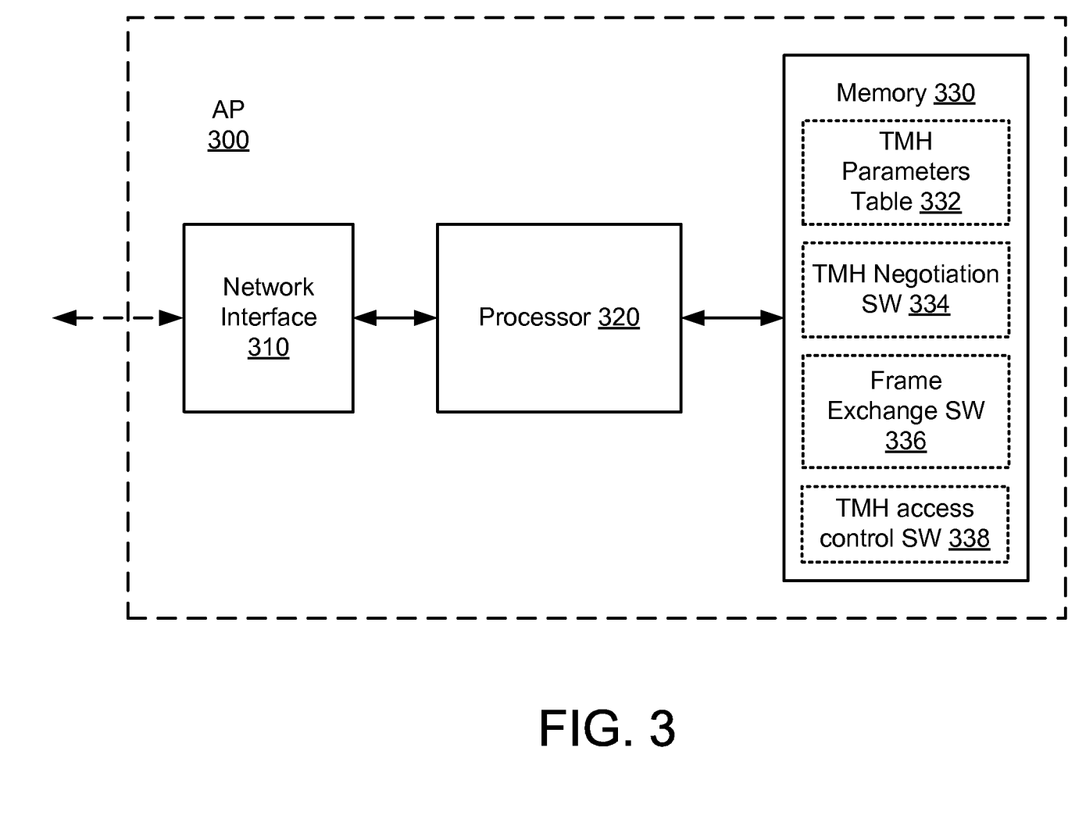
FIG. 3 shows a block diagram of an access point (AP) in accordance with some embodiments.

FIG. 3 shows an AP 300 that is one embodiment of AP 110 of FIG. 1. AP 300 includes a network interface 310, a processor 320, and a memory 330. The network interface 310 can be used to communicate with a WLAN server (not shown for simplicity) associated with WLAN 120 of FIG. 1 either directly or via one or more intervening networks and to transmit signals. Processor 320, which is coupled to network interface 310 and memory 330, can be any suitable processor capable of executing scripts or instructions of one or more software programs stored in AP 300 (e.g., within memory 330).

Memory 330 may include a TMH parameters table 332 that stores a number of TMH parameters, transmission schedules, time slots, back-off periods, random back-off numbers, and/or other parameters associated with controlling access to the shared communication medium of the WLAN 120 of FIG. 1. As mentioned above, the TMH parameters may include, for example, an indication of one or more TMH triggers, a length of a TMH period, an indication of whether the TMH period may be dynamically adjusted, a duration of a contention hold-off period, and/or an indication of the type of data that may be transmitted during the TMH period.

For some embodiments, TMH parameters table 332 may store a number of TMH parameters and associated transmission schedules and back-off periods for a number of other devices such as STA1-STA3 of FIG. 1. For such embodiments, TMH parameters table 332 may store a device ID, MAC address, and/or other information identifying these other devices.

Memory 330 also includes a non-transitory computer-readable medium (e.g., one or more nonvolatile memory elements, such as EPROM, EEPROM, Flash memory, a hard drive, and so on) that can store the following software modules:

- a TMH negotiation software module 334 to facilitate the negotiation of a number of TMH parameters with one or more stations such as STA 200 and/or a number of other APs (e.g., as described for operation 502A of FIG. 5);
- a frame exchange software module 336 to facilitate the creation and/or exchange of various frames (e.g., request frames, association frames, response frames, management frames, control frames, data frames, and/or other suitable types of frames) with AP 110 and/or one or more other STAs (e.g., as described for operations 506, 520, and 522 of FIG. 5); and
- a TMH access control software module 338 to share and/or control access to the shared communication medium (e.g., as described for operations 504, 508, 524, and 526 of FIG. 5).

Each software module includes instructions that, when executed by processor 320, cause AP 300 to perform the corresponding functions. The non-transitory computer-readable medium of memory 330 thus includes instructions for performing all or a portion of the AP-side operations of the method of FIG. 5.

Processor 320, which is coupled to network interface 310 and memory 330, can be any suitable processor capable of executing scripts or instructions of one or more software programs stored in AP 300 (e.g., within memory 330). For example, processor 320 can execute TMH negotiation software module 334 to facilitate the negotiation of a number of TMH parameters with one or more stations such as STA 200 and/or with other APs (as well as other parameters negotiated and/or exchanged during an association operation between AP 300 and a number of STAs). As mentioned above, for some embodiments, the TMH parameters may be exchanged using vendor specific information elements within frames exchanged during or after WLAN association operations. Processor 320 can also execute frame exchange software module 336 to facilitate the creation and/or exchange of association request frames, beacon frames, response frames, management frames, control frames, and/or data frames with one or more stations such as STA 200 and/or with other APs. Processor 320 can also execute TMH access control software module 338 to share and/or control access to the shared communication medium.

Figure 4A:
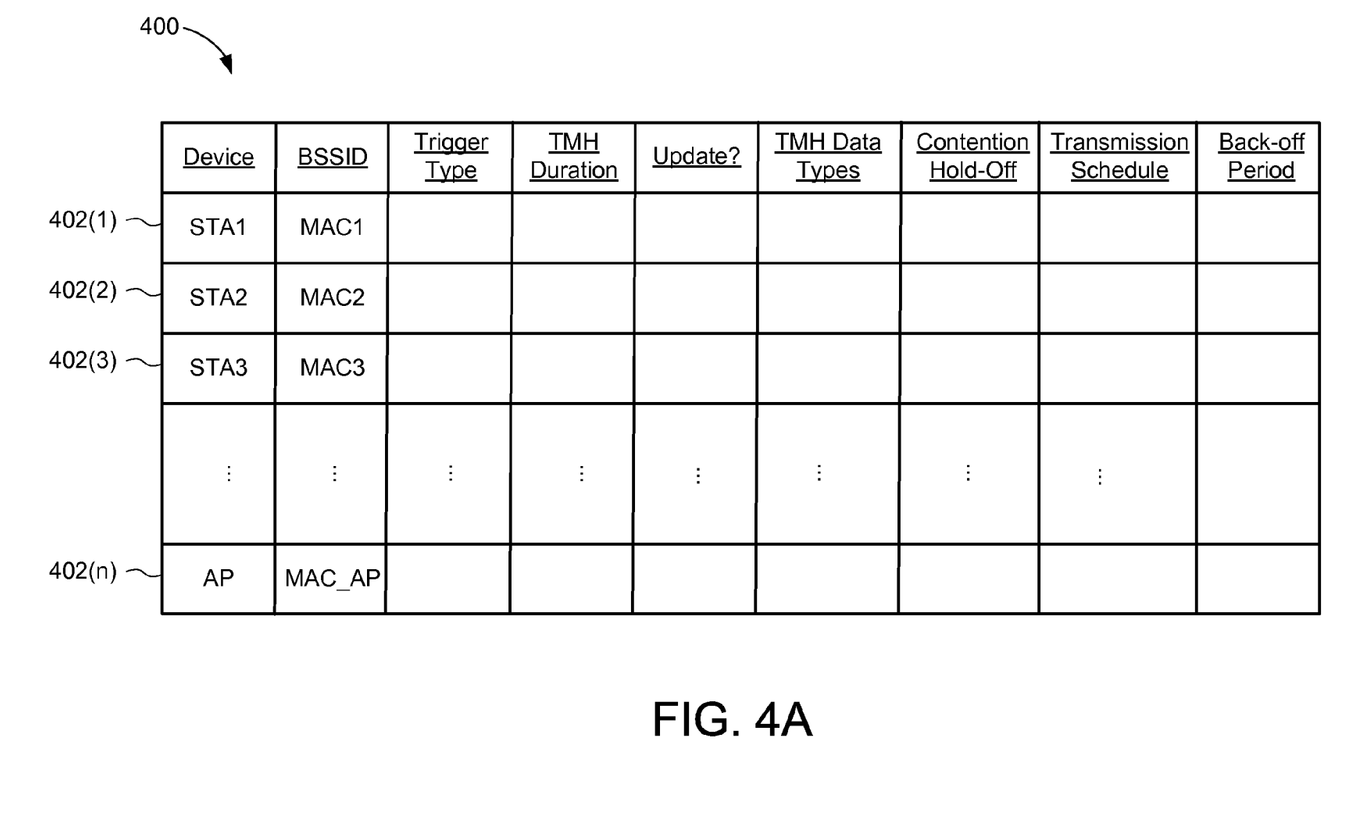
FIG. 4A depicts a scheduling table in accordance some embodiments.

FIG. 4A depicts a TMH parameters table 400 that may be used as one embodiment for the TMH parameters table 242 of STA 200 and/or for TMH parameters table 332 of AP 300 (see also FIGS. 2 and 3). The TMH parameters table 400, which may be any suitable look-up table, includes a plurality of entries 402(1)-402(n) for storing a number of TMH parameters, scheduling information, and/or back-off values for a corresponding station, access point, or other device. For some embodiments, one or more of entries 402(1)-402(n) may be omitted and/or one or more of each field of entries 402(1)-402(n) may be omitted.

Each entry 402 of TMH parameters table 400 is shown in FIG. 4A to include a device field, a BSSID field, a TMH trigger type field, a TMH duration field, a TMH update field, a TMH data type field, a contention hold-off duration field, a transmission schedule field, and a back-off period field. The device field is to store a name or ID of a corresponding wireless device. The BSSID field is to store the MAC address of the corresponding wireless device.

The TMH trigger type field is to store a value indicating which type of TMH trigger is to be used to alert another device that medium access has been granted or handed over to the other device (e.g., whether an explicit trigger signal is to be embedded into a data frame or whether transmission of a data frame serves as the TMH trigger). For example, for some operations, a device (e.g., STA 200 or AP 300) may be configured to interpret reception of certain types of frames as an implicit TMH trigger for a TMH opportunity. These certain types of frames may include, for example, a Quality of Service (QoS) frame and/or a block acknowledgement request (BAR) frame. For other operations, the device (e.g., STA 200 or AP 300) may be configured to recognize a TMH opportunity in response to an explicit TMH trigger embedded into, for example, a data frame received from another device.

Figure 4B:
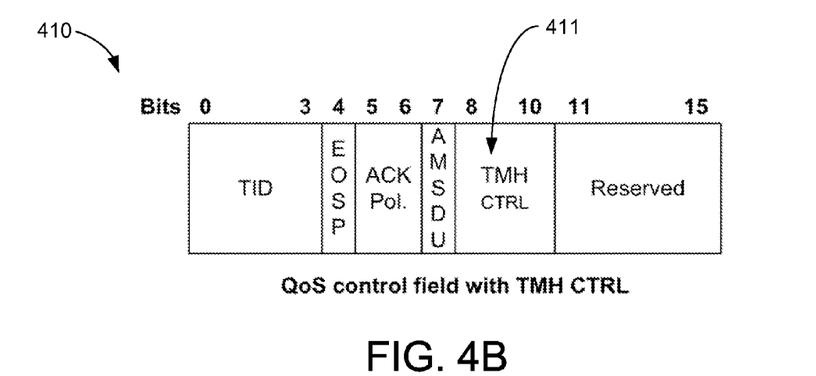
FIG. 4B depicts a QoS frame in accordance some embodiments.

More specifically, FIG. 4B depicts a QoS frame 410 in accordance with some embodiments. QoS frame 410 is modified, in accordance with the present embodiments, to include a TMH control field 411 that may include an explicit TMH trigger or message. The TMH control field 411 may also include additional TMH trigger information such as, for example, the type of traffic for which the corresponding trigger is intended, an indication of a maximum response time to the TMH opportunity, an indication of a contention period holdout time value, and a maximum number of frame exchanges the STA is to perform during the TMH opportunity. For at least one embodiment, the additional TMH trigger information may correspond to more than one TMH trigger. During frame exchanges, a device (e.g., STA 200) receiving QoS frame 410 having (i) an immediate ACK or an implicit block acknowledgement (BA) request set request set (or alternatively no request set) and (ii) a power state bit not set may be informed that it has been granted a TMH opportunity to take over control of the medium. For such embodiments, the device transmitting the QoS frame 410 may embed the TMH trigger into TMH control field 411. For other embodiments, the TMH trigger may be embedded into one or more other bit locations of QoS frame 410.

Figure 4C:
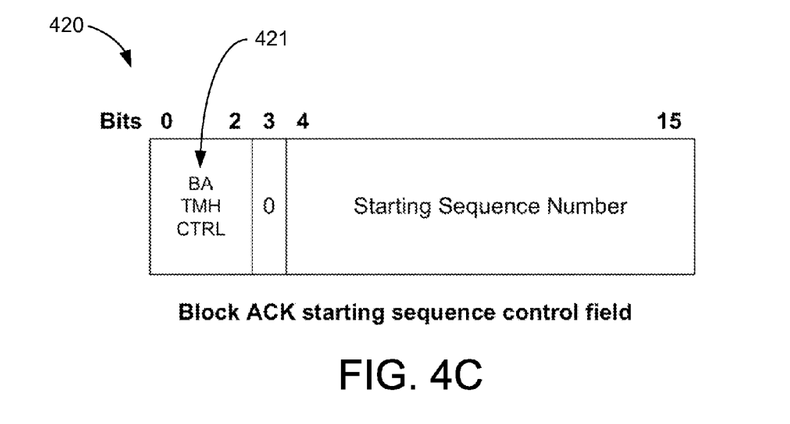
FIG. 4C depicts a BAR frame in accordance some embodiments.

FIG. 4C depicts a BAR frame 420 in accordance with some embodiments. BAR frame 420 is modified, in accordance with the present embodiments, to include a BA TMH control field 421 that may include an explicit TMH trigger or message. The TMH control field 421 may also include additional TMH trigger information such as, for example, the type of traffic for which the corresponding trigger is intended, an indication of a maximum response time to the TMH opportunity, an indication of a contention period holdout time value, and a maximum number of frame exchanges the STA is to perform during the TMH opportunity. For at least one embodiment, the additional TMH trigger information may correspond to more than one TMH trigger. During frame exchanges, a device (e.g., STA 200) receiving BAR frame 420 may be informed that it has been granted a TMH opportunity to take over control of the medium. For such embodiments, the device transmitting the BAR frame 420 may embed the TMH trigger into BA TMH control field 421. For other embodiments, the TMH trigger may be embedded into one or more other bit locations of BAR frame 420.

Figure 4D:
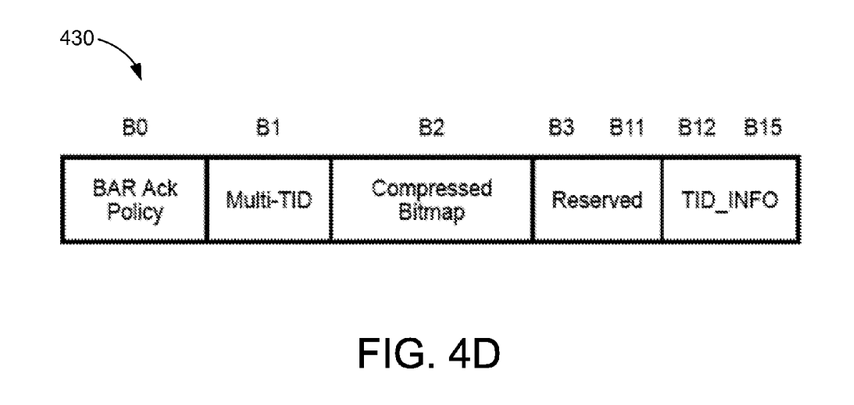
FIG. 4D depicts a BAR control field in accordance some embodiments.

FIG. 4D depicts a BAR control field 430 in accordance with some embodiments. BAR control field 430 may be modified, in accordance with the present embodiments, to include an explicit TMH trigger or message stored in one or more of the reserved bits B3-B11. During frame exchanges, a device (e.g., STA 200) receiving BAR control field 430 may be informed that it has been granted a TMH opportunity to take over control of the medium. For other embodiments, the TMH trigger may be embedded into one or more other bit locations of BAR control field 430.

Referring again to FIG. 4A, the TMH duration field is to store a value indicating a duration of TMH period. The TMH update field is to store a value indicating whether the TMH period may be dynamically adjusted. The TMH data type field is to store a value indicating which types of data frames may be transmitted during the TMH period. The contention hold-off duration field is to store a value indicating how long the device should be prevented from contending for medium access after transmitting data during the TMH period (e.g., in response to a TMH opportunity). The transmission schedule field is to store one or more values indicating a transmission schedule (if any) of the corresponding device. The back-off period field is to store a value indicating the duration of the device's back-off period.

An exemplary operation in which access to a communication medium is shared between an access point (e.g., AP 110 of FIG. 1) and a wireless station (e.g., STA1 of FIG. 1) is described below with respect to the illustrative flow chart 500 of FIG. 5. Although described below in the context of an access point (AP) and a station (STA), the operation of flow chart 500 of FIG. 5 may be applicable to sharing medium access between the access point and a plurality of stations, to sharing medium access between any number of stations, and/or to sharing medium access between any number of access points.

First, the AP and the STA may negotiate a number of TMH parameters for sharing access to the communication medium associated with WLAN 120 of FIG. 1 (502A and 502B). As mentioned above, the TMH parameters may include a TMH trigger type value, a TMH duration value, a TMH update value, a TMH data type value, a contention hold-off duration value, a transmission schedule, and a back-off duration value. For some embodiments, once the values of the TMH parameters are negotiated, they may be stored within corresponding fields of TMH parameters table 242 of the STA and/or within corresponding fields of TMH parameters table 332 of the AP. For other embodiments, the TMH parameters may be predetermined and stored in tables 242 and 332 of the STA and AP, respectively (see also FIGS. 2-3).

The AP reserves access to the shared wireless communication medium for a first interval (504). For some embodiments, the first interval may be associated with a transmission schedule or transmission time slot assigned to the AP. The AP transmits a data frame to the STA (506), and then grants medium access to the STA for a remainder of the first interval (508). As mentioned above, the duration of time corresponding to the remainder of the first interval is referred to herein as the TMH period.

The AP may inform the STA that it has been granted medium access in any suitable manner, for example, as agreed upon during the negotiation of TMH parameters. Thus, for some operations, the AP may explicitly inform the STA of the medium access grant by embedding a trigger signal within the data frame(s) sent to the STA, while for other operations, the AP may implicitly inform the STA of the medium access grant merely by sending the data frame to the STA.

As mentioned above, for some embodiments, the STA may be configured to interpret certain types of data frames as implicit TMH triggers. For example, the STA may be configured to interpret quality of service (QoS) or block acknowledgement request (BAR) data frames, received from the AP, as triggering a TMH opportunity. In other embodiments, the data frame transmitted by the AP may be explicitly encoded with one or more TMH trigger bits.

The STA receives the data frame from the AP, and may acknowledge its receipt by sending an acknowledgement (ACK) frame to the AP (510). Receipt of the data frame may also inform the STA that it has been granted access to the shared medium (e.g., either explicitly or implicitly). If the STA has a data frame to send (e.g., to the AP and/or to another device), as tested at 512, then the STA transmits the data frame (514). Because the STA transmitted data during the TMH period (e.g., during a transmission slot previously reserved for the AP), the STA is prevented from contending for medium access during a next contention period (516). This ensures that other devices (e.g., that did not transmit data during the AP's reserved transmission interval) may have access to the medium before the STA once again has medium access, thereby providing fair medium access to all devices associated with the shared communication medium.

Conversely, if the STA does not have a data frame to send, as tested at 512, then the STA is enabled to contend for medium access during the next contention period (518). This ensures that the STA will have the same opportunity for medium access during the next contention period as other devices associated with the shared communication medium. For some embodiments, the STA may initiate a contention period holdout operation associated with the next contention period.

The AP monitors the shared communication medium to determine whether the STA transmitted a data frame during the TMH period (520). In response thereto, medium access may be selectively returned to the AP. More specifically, if the AP determines that the STA transmitted a data frame during the TMH period, as tested at 522, then the STA's medium access is maintained (524). Maintaining the STA's medium access may allow the STA to continue transmitting data frames for the duration of the TMH period. Conversely, if the AP determines that the STA has not transmitted any data frames during the TMH period, as tested at 522, then the AP reclaims medium access from the STA (526). Returning medium access to the AP (e.g., because the STA does not have any data to transmit) for the rest of the TMH period may avoid idle periods on the shared communication medium, thereby increasing throughput of the shared communication medium.

Figure 6A:
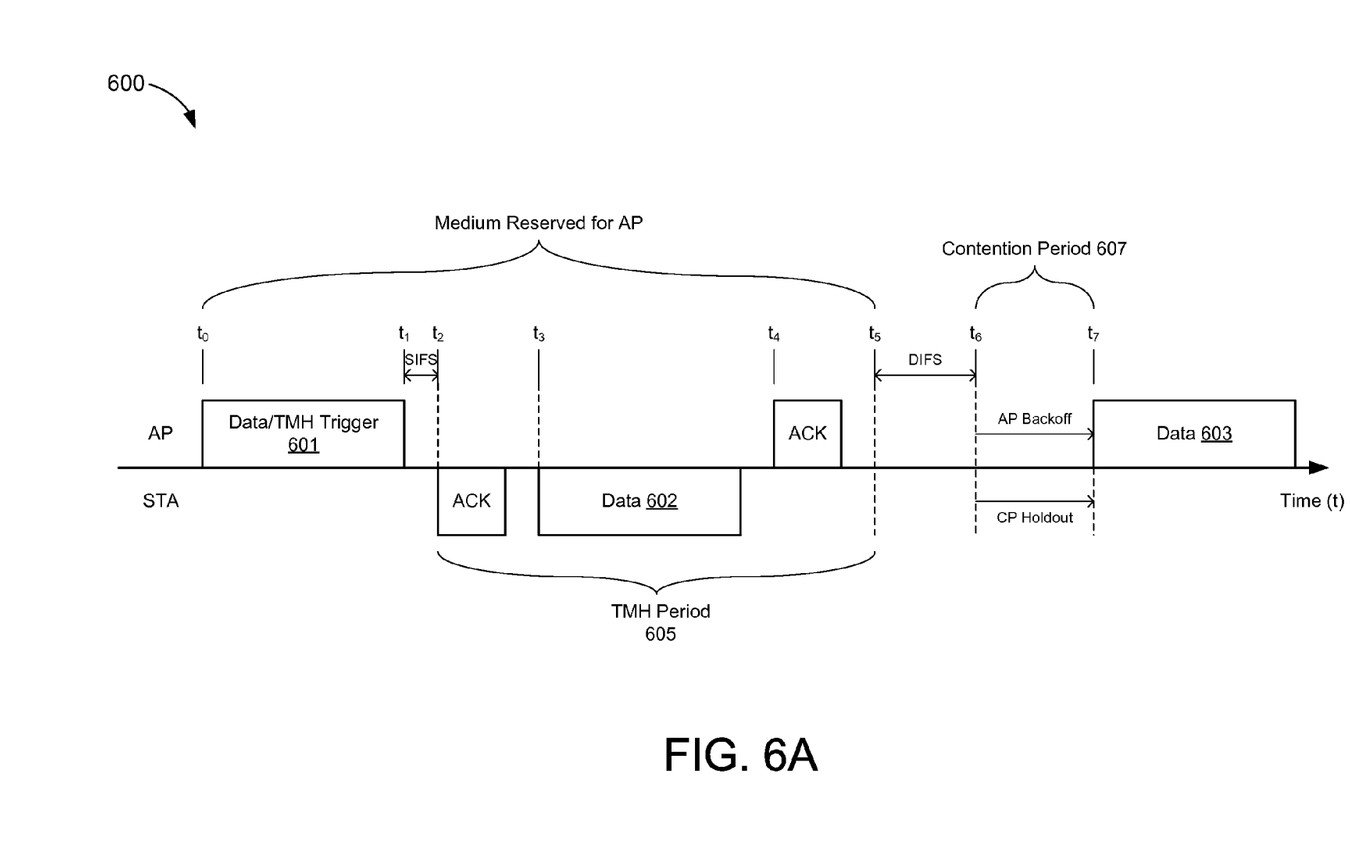
FIG. 6A shows a timing diagram depicting an exemplary temporary medium handover (TMH) operation in accordance with some embodiments.

FIG. 6A is a timing diagram 600 depicting a first exemplary temporary medium handover (TMH) operation between an access point (AP) and a station (STA) in accordance with some embodiments. For other embodiments, the operation depicted by timing diagram 600 may be performed between the AP and a plurality of STAs, between a plurality of STAs, and/or between a plurality of APs. For the exemplary TMH operation of FIG. 6A, the communication medium has been reserved for the AP for a first transmission interval from time $t_0$ to time $t_5$.

More specifically, at time $t_0$, the AP transmits a data frame 601 to the STA. The data frame 601 transmitted by the AP may either contain or serve as a TMH trigger that informs the STA that medium access is granted (e.g., temporarily handed over) to the STA for a remainder of the first interval. The STA receives the data frame 601 and associated TMH trigger at time $t_1$, waits for a Short Interframe Space (SIFS) duration, and then transmits an acknowledgement (ACK) frame at time $t_2$ to inform the AP that the data frame 601 was successfully received by the STA. The remainder of the first interval, which is denoted in FIG. 6A as the TMH period 605, begins at time $t_2$ and ends at time $t_5$. Because medium access has been granted to the STA for the TMH period 605, the STA may transmit data to one or more other devices during the TMH period 605.

At time $t_3$, the STA transmits a data frame 602. Note that because the SIFS duration is much shorter than the DCF Interframe Space (DIFS) duration (which indicates the minimum period of time that a station determines the medium to be continuously idle before transmitting a frame), other devices associated with the medium will not have a chance to contend for the medium prior to the STA transmitting its own data frame 602.

At time $t_4$, the AP may send an ACK frame to the STA to acknowledge its receipt of the data frame 602. The first transmission interval ends at time $t_5$, and is followed by a DIFS duration (from time $t_5$ to time $t_5$) wherein neither the AP nor the STA transmits data using the medium. The TMH period 605 also ends at time $t_5$. As described above, the duration of the TMH period 605 (including the time allotted for the STA to transmit data, and the time allotted for the AP to send one or more response packets) may be negotiated between the AP and the STA during association.

After the end of the DIFS duration at time $t_6$, a medium contention period 607 begins and lasts until time $t_7$. During the contention period 607, the AP and other devices associated with the medium may contend for medium access. In accordance with the present embodiments, the STA is prevented from contending for medium access during the contention period 607 because the STA transmitted its own data frame 602 during the TMH period 605 associated with the previous transmission interval reserved for the AP. In this manner, the present embodiments ensure fair access to the medium by allowing devices that did not transmit data during the TMH period 605 to have a higher priority than devices that transmitted data during the TMH period 605. For some embodiments, the STA may prevent itself from contending for medium access during the contention period 607 by asserting an internal contention period (CP) Holdout signal. For at least one embodiment, the CP holdout period may be configured to cover more than one contention period.

Because the STA holds out during the contention period 607 (between times $t_6$ and $t_7$) and does not contend for medium access, the AP may regain access to the medium at time $t_7$ and thereafter transmit another data frame 603 (e.g., after waiting for a duration of time equal to a randomly assigned AP Back-off time).

Figure 6B:
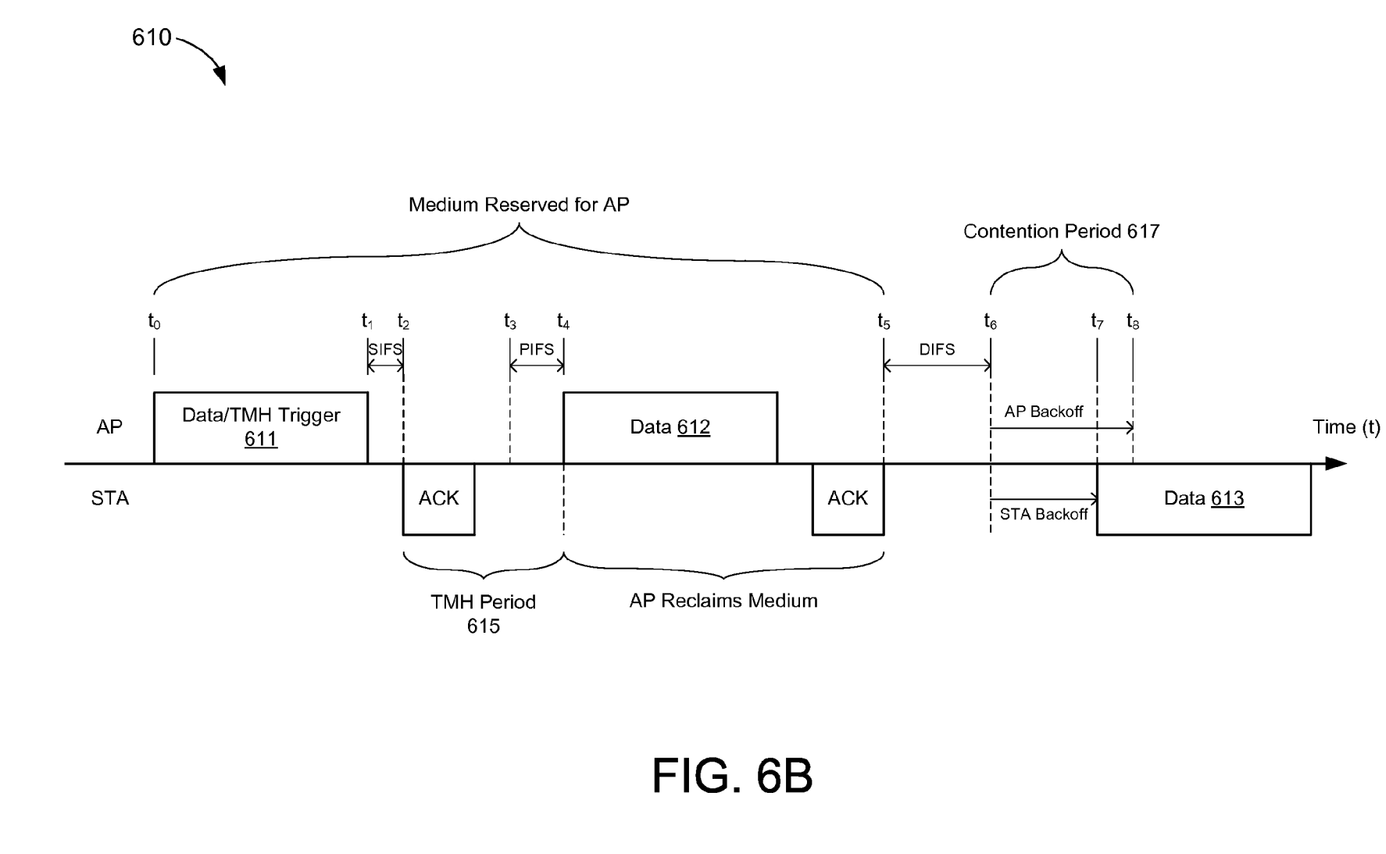
FIG. 6B shows a timing diagram depicting an exemplary TMH operation in accordance with other embodiments.

FIG. 6B is a timing diagram 610 depicting a second exemplary TMH operation between the AP and the STA in accordance with some embodiments. For other embodiments, the operation depicted by timing diagram 610 may be performed between the AP and a plurality of STAs, between a plurality of STAs, and/or between a plurality of APs. For the exemplary TMH operation of FIG. 6B, the communication medium has been reserved for the AP for a first transmission interval from time $t_0$ to time $t_5$.

More specifically, at time $t_0$, the AP transmits a data frame 611 to the STA. The data frame 611 transmitted by the AP may either contain or serve as a TMH trigger that informs the STA that medium access is granted (e.g., temporarily handed over) to the STA for a remainder of the first interval. The STA receives the data frame 611 and associated TMH trigger at time $t_1$, waits for a SIFS duration, and then transmits an acknowledgement (ACK) frame at time $t_2$ to inform the AP that the data frame 611 was successfully received by the STA. The remainder of the first interval, which is denoted in FIG. 6B as the TMH period 615, begins at time $t_2$ and ends at time L. Because medium access has been granted to the STA for the TMH period 615, the STA may transmit data to one or more other devices during the TMH period 615.

For the operation depicted in FIG. 6B, the STA does not have data to transmit during the TMH period 615. Thus, rather than transmitting data during the TMH period 615, the STA ignores the TMH period or opportunity granted by the AP.

At time 4, the AP senses that the medium has been idle for a time equal to a Point Coordination Function (PCF) Interframe Space (PIFS) duration (e.g., from time $t_3$ to time $t_4$), and reclaims access to the medium for the remaining portion of its first transmission interval (which ends at time $t_5$). Thus, the TMH period 615 terminates at time $t_4$ in response to the AP reclaiming access to the medium. Thereafter, the AP transmits another data frame 612 to the STA. In response thereto, the STA transmits an ACK frame to the AP to acknowledge receipt of the data frame 612. Note that because PIFS duration is shorter than the DIFS duration, other devices associated with the medium do not have an opportunity to contend for medium access prior to the expiration of the first transmission interval at time $t_5$.

The first transmission interval ends at time $t_5$, and is followed by a DIFS duration (from $t_5$ to $t_6$) wherein neither the AP nor the STA transmits data using the medium. After the end of the DIFS duration at time $t_6$, a medium contention period 617 begins and lasts until time $t_8$. Although the STA was given temporary control of the medium at time $t_2$, the STA did not use the TMH period 615 to transmit data. Thus, in accordance with the present embodiments, the STA is allowed to contend with the AP for medium access during the contention period 617 (e.g., from time $t_6$ to $t_8$). For the exemplary operation of FIG. 6B, the STA's back-off period (e.g., from time $t_6$ to time $t_7$) is shorter than the AP's back-off period (e.g., from time $t_6$ to time $t_8$), and therefore the STA wins control of the medium at time $t_7$. Thereafter, the STA may transmit a data frame 613 at or after time $t_7$. As mentioned above, for some embodiments, the STA may initiate a contention period holdout operation associated with contention period 607. For at least one embodiment, the contention period holdout operation may be configurable for the STA.

The present embodiments may reduce the number and/or frequency of collisions in a WLAN system (e.g., WLAN 120 of FIG. 1) by allowing devices such as APs and/or STAs to share the wireless communication medium during periods in which they have reserved access to the medium. More specifically, by allowing a first device that has reserved medium access during a transmission interval to temporarily handover medium access to a second device for a remainder of the transmission interval, the second device is able to transmit data using the medium during an interval that would have otherwise been reserved for use by the first device. In this manner, throughput of the wireless medium may be increased. Further, by preventing the second device from contending for medium access during a next contention period (i.e., if the second device took advantage of the granted TMH period), then the first device has priority over the second device during the contention period to ensure that the first device is provided fair access to the medium. In addition, preventing the second device from contending for medium access during the next contention period may also reduce frame collisions on the shared wireless medium, which in turn may increase throughput of the shared wireless medium. Thus, the TMH operations described herein may benefit devices that do not support such TMH operations by reducing collisions on the shared wireless medium.

In addition, the TMH operations described herein may reduce idle periods on the medium by allowing the first device to detect whether the second device has data to transmit during a TMH period granted to the second device, and then quickly reclaim the medium if the second device does not transmit any data during the TMH period.

Figure 6C:
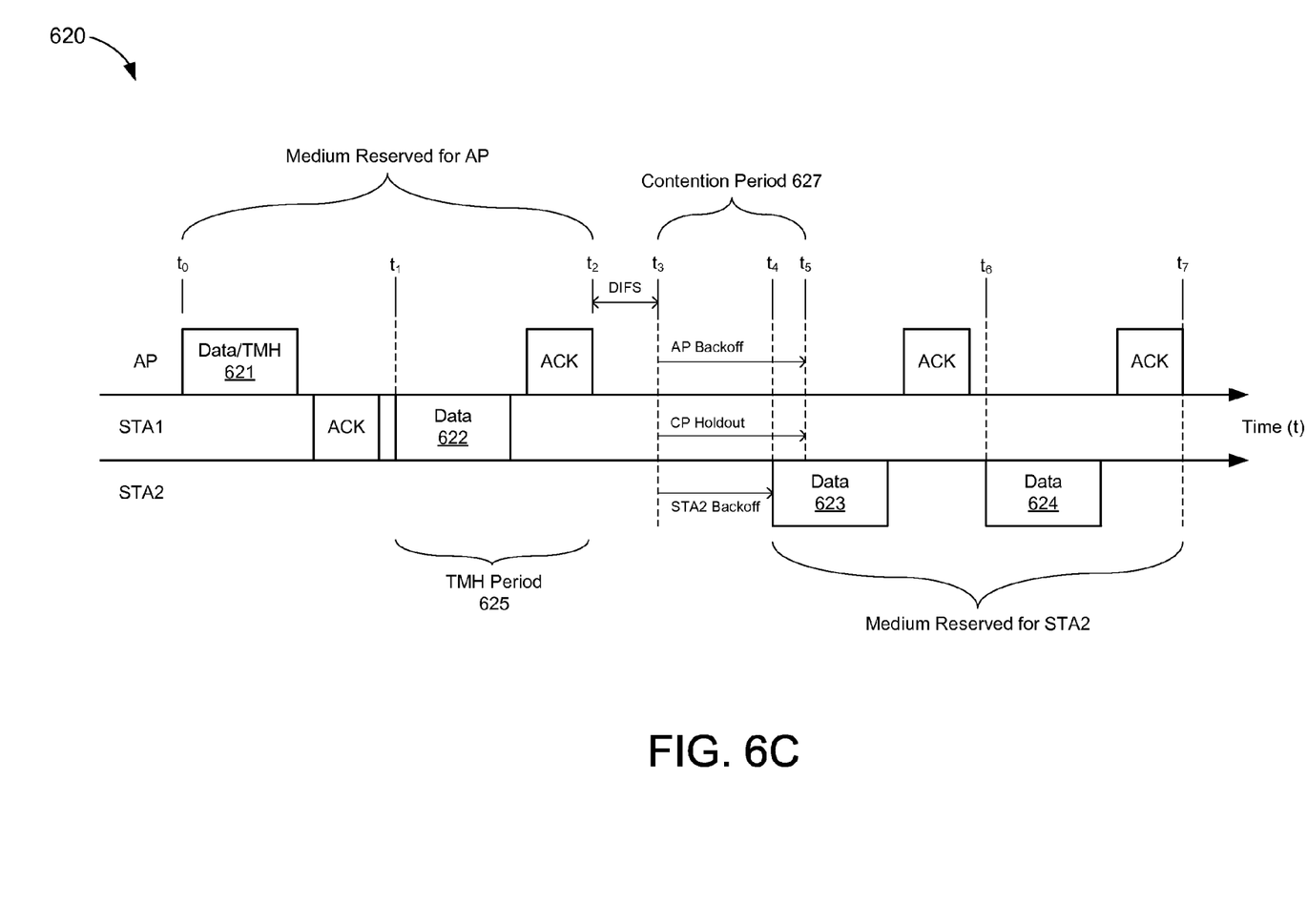
FIG. 6C shows a timing diagram depicting an exemplary TMH operation in accordance with still other embodiments.

The present embodiments may also benefit wireless devices that are not configured to take advantage of the TMH operations described herein by reducing collisions on the medium, which in turn reduces unnecessary transmissions on the medium associated with re-transmitting collided data frames. For example, FIG. 6C is a timing diagram 620 depicting a third exemplary TMH operation between the AP and two station STA1-STA2 in accordance with some embodiments. For other embodiments, the operation depicted by timing diagram 620 may be performed between a plurality of STAs and/or between a plurality of APs. For the exemplary TMH operation of FIG. 6C, the communication medium has been reserved for the AP for a first transmission interval from time $t_0$ to time $t_2$.

More specifically, at time $t_0$, the AP transmits a data frame 621 to STA1. The data frame 621 transmitted by the AP may either contain or serve as a TMH trigger that informs STA1 that medium access is granted (e.g., temporarily handed over) to STA1 for a remainder of the first interval. STA1 receives the data frame 621 and associated TMH trigger, waits for a SIFS duration, and then transmits an acknowledgement (ACK) frame to inform the AP that the data frame 621 was successfully received by STA1. The remainder of the first interval, which is denoted in FIG. 6C as the TMH period 625, begins at time $t_1$ and ends at time $t_2$. Because medium access has been granted to STA1 for the TMH period 625, STA1 may transmit data to one or more other devices during the TMH period 625. In response to receiving data frame 622 from STA1, the AP transmits an ACK frame to STA1.

At time $t_2$, the TMH period 625 ends. After expiration of a DIFS duration, a contention period 627 begins at time $t_3$ and lasts until time $t_5$. Because STA1 transmitted data frame 622 during the TMH period 625, STA1 is prevented from contending for medium access during the contention period 627, and thus "holds out" during contention period 627. As result, only the AP and STA2 may contend for medium access during contention period 627. For the exemplary operation of FIG. 6C, STA2 is depicted as having a back-off period that lasts until time $t_4$, and the AP is depicted as having a back-off period that lasts until time $t_5$. Thus, because STA2's back-off period expires before the AP's back-off period, STA2 wins control of the medium at time $t_4$ and reserves medium access for a transmission interval that lasts until time $t_7$. In response thereto, STA2 transmits its own data frame 623 shortly after time L. Upon receiving data frame 623 from STA2, the AP transmits an ACK frame to STA2. At time $t_6$, STA2 transmits another data frame 624, and the AP responds by sending a corresponding ACK frame to STA2.

As depicted in FIG. 6C, STA2 may benefit from TMH protocols of the present embodiments even though STA2 is not configured to transmit data frames during TMH period 625. More specifically, by reducing the number of devices contending for medium access during contention period 627 (e.g., STA1 is prevented from competing for medium access during contention period 627), collisions on the medium are reduced, thereby increasing overall throughput on the medium for all associated devices (e.g., the AP, STA1, and STA2). This is in contrast to conventional WLAN systems for which all three devices (the AP, STA1, and STA2) may compete for medium access during the contention period 627.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of sharing access to a wireless communication medium associated with a wireless network, the method comprising:
   reserving access to the medium for a first wireless device for a first interval;
   granting medium access to a second wireless device for a remainder of the first interval by transmitting a first data frame from the first wireless device;
   determining whether a second data frame is transmitted from the second wireless device within a predetermined time period after the granting;
   selectively returning medium access to the first wireless device for the remainder of the first interval in response to the determining; and
   preventing the second wireless device from contending for medium access during a subsequent contention period if the second wireless device transmits the second data frame during the first interval.

2. The method of claim 1, wherein the first wireless device comprises an access point, and the first interval comprises a scheduled transmission interval for the access point.

3. The method of claim 1, wherein the first wireless device comprises a first mobile station, and the second wireless device comprises a second mobile station.

4. The method of claim 1, wherein the predetermined time period comprises a point coordination function interframe space (PIFS) duration.

5. The method of claim 1, wherein the first data frame includes an embedded trigger signal to inform the second wireless device of the granting.

6. The method of claim 5, wherein the first data frame comprises a quality of service (QoS) frame.

7. The method of claim 5, wherein the first data frame comprises a block acknowledgement request (BAR) frame.

8. The method of claim 1, wherein the selectively returning comprises:
   maintaining medium access for the second wireless device if the second wireless device transmits the second data frame; and
   reclaiming medium access for the first wireless device if the second wireless device does not transmit the second data frame within the predetermined time period.

9. A system for sharing access to a wireless communication medium associated with a wireless network, the system comprising:
   means for reserving access to the medium for a first wireless device for a first interval;
   means for granting medium access to a second wireless device for a remainder of the first interval by transmitting a first data frame from the first wireless device;
   means for determining whether a second data frame is transmitted from the second wireless device within a predetermined time period after the granting;
   means for selectively returning medium access to the first wireless device for the remainder of the first interval in response to the determining; and
   means for preventing the second wireless device from contending for medium access during a subsequent contention period if the second wireless device transmits the second data frame during the first interval.

10. The system of claim 9, wherein the first wireless device comprises an access point, and the first interval comprises a scheduled transmission interval for the access point.

11. The system of claim 9, wherein the first wireless device comprises a first mobile station, and the second wireless device comprises a second mobile station.

12. The system of claim 9, wherein the predetermined time period comprises a point coordination function interframe space (PIFS) duration.

13. The system of claim 9, wherein the first data frame includes an embedded trigger signal to inform the second wireless device of the granting.

14. The system of claim 13, wherein the first data frame comprises a quality of service (QoS) frame.

15. The system of claim 13, wherein the first data frame comprises a block acknowledgement request (BAR) frame.

16. The system of claim 9, wherein the means for selectively returning comprises:
   means for maintaining medium access for the second wireless device if the second wireless device transmits the second data frame; and
   means for reclaiming medium access for the first wireless device if the second wireless device does not transmit the second data frame within the predetermined time period.

17. A non-transitory computer-readable medium containing program instructions that, when executed by a processor of a first wireless device associated with a wireless network, cause the first wireless device to:
   reserve access to a communication medium for a first interval;
   grant communication medium access to a second wireless device for a remainder of the first interval by transmitting a first data frame from the first wireless device;
   determine whether a second data frame is transmitted from the second wireless device within a predetermined time period after the grant;
   selectively return communication medium access to the first wireless device for the remainder of the first interval in response to the determining; and
   prevent the second wireless device from contending for communication medium access during a subsequent contention period if the second wireless device transmits the second data frame during the first interval.

18. The non-transitory computer-readable medium of claim 17, wherein the first wireless device comprises an access point, and the first interval comprises a scheduled transmission interval for the access point.

19. The non-transitory computer-readable medium of claim 17, wherein the first wireless device comprises a first mobile station, and the second wireless device comprises a second mobile station.

20. The non-transitory computer-readable medium of claim 17, wherein the predetermined time period comprises a point coordination function interframe space (PIFS) duration.

21. The non-transitory computer-readable medium of claim 17, wherein the first data frame includes an embedded trigger signal to inform the second wireless device of the grant.

22. The non-transitory computer-readable medium of claim 17, wherein execution of the program instructions further cause the first wireless device to:
transmit a trigger signal from the first wireless device to the second wireless device.

23. The non-transitory computer-readable medium of claim 17, wherein the first wireless device is to selectively return medium access by:
maintaining medium access for the second wireless device if the second wireless device transmits the second data frame; and
returning medium access to the first wireless device if the second wireless device does not transmit the second data frame within the predetermined time period.

24. A wireless device associated with a wireless communication medium, the wireless device comprising:
a transmitter to transmit a first data frame to another wireless device; and
a processor to:
grant medium access to the other wireless device for a remainder of a first interval by transmitting the first data frame to the other wireless device;
determine whether a second data frame is transmitted from the other wireless device within a predetermined time period after the grant;
selectively return medium access to the wireless device for the remainder of the first interval in response to the determining; and
prevent the other wireless device from contending for medium access during a subsequent contention period if the other wireless device transmits the second data frame during the first interval.

25. The wireless device of claim 24, wherein the first wireless device comprises an access point, and the first interval comprises a scheduled transmission interval for the access point.

26. The wireless device of claim 24, wherein the first wireless device comprises a first mobile station, and the other wireless device comprises a second mobile station.

27. The wireless device of claim 24, wherein the predetermined time period comprises a point coordination function interframe space (PIFS) duration.

28. The wireless device of claim 24, wherein the processor is to further:
transmit a trigger signal from the first wireless device to the second wireless device.

29. The wireless device of claim 24, wherein the processor is to selectively return medium access by:
maintaining medium access for the other wireless device if the other wireless device transmits the second data frame; and
reclaiming medium access for the wireless device if the other wireless device does not transmit the second data frame within the predetermined time period.

* * * * *